(12) United States Patent
Kirk et al.

(10) Patent No.: US 11,420,651 B2
(45) Date of Patent: Aug. 23, 2022

(54) VEHICLE MODE AND PASSENGER INTERFACE

(71) Applicants: Ford Global Technologies, LLC, Dearborn, MI (US); LIVIO, INC., Royal Oak, MI (US)

(72) Inventors: Austin Kirk, Sterling Heights, MI (US); John Byrne, Detroit, MI (US); Joey Ray Grover, Madison Heights, MI (US); Brett McIsaac, Rochester Hills, MI (US); Theresa Lech, Berkley, MI (US)

(73) Assignees: FORD GLOBAL TECHNOLOGIES, LLC, Dearborn (ML); LIVIO, INC., Royal Oak, MI (US)

( * ) Notice: Subject to any disclaimer, the term of this patent is extended or adjusted under 35 U.S.C. 154(b) by 161 days.

(21) Appl. No.: 16/760,519

(22) PCT Filed: Nov. 1, 2017

(86) PCT No.: PCT/US2017/059431
§ 371 (c)(1),
(2) Date: Apr. 30, 2020

(87) PCT Pub. No.: WO2019/089019
PCT Pub. Date: May 9, 2019

(65) Prior Publication Data
US 2021/0197867 A1    Jul. 1, 2021

(51) Int. Cl.
*B60W 60/00* (2020.01)
*H04W 4/40* (2018.01)
(Continued)

(52) U.S. Cl.
CPC ...... *B60W 60/00133* (2020.02); *B60W 40/08* (2013.01); *G06V 20/593* (2022.01);
(Continued)

(58) Field of Classification Search
CPC ......... B60W 60/00133; A61B 15/0002; A61B 5/0476; G06F 3/0487; G06F 17/30;
(Continued)

(56) References Cited

U.S. PATENT DOCUMENTS 6,663,010 B2   12/2003   Chene et al.
9,663,004 B2    5/2017   Perrin et al.
(Continued)

FOREIGN PATENT DOCUMENTS

CN   202593327 U      12/2012
CN   102991419 A   *   3/2013   ............... B60Q 5/00
(Continued)

OTHER PUBLICATIONS

Naughton, Keith. Ford's Dozing Engineers Side With Google in Full Autonomy Push. Bloomberg. Feb. 17, 2017. 5 pages. https://www.bloomberg.com/news/articles/2017-02-17/ford-s-dozing-engineers-side-with-google-in-full-autonomy-push.
(Continued)

*Primary Examiner* — Yuri Kan
(74) *Attorney, Agent, or Firm* — Gregory P. Brown; Brooks Kushman P.C.

(57) ABSTRACT

A vehicle system including a vehicle component and a controller is provided. The controller may selectively activate the vehicle component and communicate with a mobile unit including an interface. The controller may be programmed to interact with the mobile unit upon detection by accessing vehicle sleep mode instructions preprogrammed by a user via the interface in which the controller activates the vehicle component according to an escalation sequence schedule to disengage a vehicle sleep mode. The system may further include a sensor in communication with the vehicle component and the controller. The controller may be further programed to activate the vehicle component according to
(Continued)

the escalation sequence schedule based on receipt of a signal from a sensor indicating a passenger is asleep.

20 Claims, 4 Drawing Sheets

(51) Int. Cl.
*B60W 40/08* (2012.01)
*G06V 20/59* (2022.01)

(52) U.S. Cl.
CPC ............ *G06V 20/597* (2022.01); *H04W 4/40* (2018.02); *B60W 2040/0827* (2013.01); *B60W 2040/0881* (2013.01)

(58) Field of Classification Search
CPC ............ G06F 1/3215; H04W 52/0229; B60R 16/023; B60R 16/02; B60Q 5/00
See application file for complete search history.

(56) References Cited

U.S. PATENT DOCUMENTS

| | | |
|---|---|---|
| 9,725,036 B1 | 8/2017 | Tarte |
| 2008/0051154 A1* | 2/2008 | Schlomann ....... H04W 52/0229 455/567 |
| 2008/0119994 A1 | 5/2008 | Kameyama |
| 2010/0197359 A1 | 8/2010 | Harris |
| 2014/0292521 A1 | 10/2014 | Perle |
| 2016/0152250 A1 | 6/2016 | Franchitti et al. |
| 2016/0176409 A1 | 6/2016 | Kirsch et al. |
| 2017/0028163 A1 | 2/2017 | Onuma et al. |
| 2017/0282684 A1 | 10/2017 | Fearns et al. |

FOREIGN PATENT DOCUMENTS

| | | | | |
|---|---|---|---|---|
| CN | 103269407 A | * | 8/2013 | ............ A61B 5/0476 |
| CN | 104112248 A | * | 10/2014 | ............. G06F 17/30 |
| CN | 205417465 U | * | 8/2016 | ............ B60R 16/023 |
| CN | 106569656 A | * | 4/2017 | ............ G06F 3/0487 |
| EP | 3176666 A1 | | 6/2017 | |
| JP | 5782793 B2 | * | 9/2015 | ............. B60R 16/02 |
| KR | 20150016021 A | * | 2/2015 | ......... A61B 15/0002 |
| KR | 20160148395 A | | 12/2016 | |
| WO | WO-2012151977 A1 | * | 11/2012 | ............ G06F 1/3215 |

OTHER PUBLICATIONS

International Search Report of the International Searching Authority for PCT/US2017/059431 dated Jan. 31, 2018.

* cited by examiner

US 11,420,651 B2

VEHICLE MODE AND PASSENGER INTERFACE

TECHNICAL FIELD

This disclosure relates to programmable vehicle component activation based on passenger input.

BACKGROUND

Passengers of autonomous vehicles or ride-sharing services may desire to sleep during their trip. As a result, the passengers may desire wake-up options along the trip or at arrival at a final destination. Further, the passengers may have a specific set of vehicle component operating conditions that optimizes their comfort during both sleep and at wake-up.

SUMMARY

A vehicle system includes a vehicle component and a controller. The controller is programmed to, responsive to detecting presence of a mobile unit and selection of a passenger sleep mode, access from the mobile unit preprogrammed sleep mode instructions and activate the vehicle component according to a sequence of escalating operations defined by the sleep mode instructions to exit the vehicle sleep mode. The controller may be further programmed to send a notice to the mobile unit upon requesting the user to confirm access to the vehicle sleep mode instructions. A sensor may be in communication with the vehicle component and the controller and the controller may be further programed to activate the vehicle component based on receipt of a signal from the sensor indicating a passenger is asleep. The signal from the sensor may indicate a passenger is asleep based on detection of one of a cabin noise level being below a predetermined value, movement of a seat occupant being below a predetermined threshold, a manual passenger input, and an absence of sensor activity. The activation of the vehicle component may be initiated based on detection of one of expiration of a predetermined time frame, arrival at a predetermined location, and receipt of a signal indicating a phone call or other notification to the mobile unit. The vehicle component may be an audio system in communication with the controller and the sequence of escalating operations may be a command schedule directing a series of audio outputs by the audio system to subsequently increase in volume. The vehicle component may be a seat assembly in communication with the controller and the sequence of escalating operations may be a command schedule directing a series of seat assembly outputs by the seat assembly to subsequently and increasingly contact the user.

A vehicle connectivity system includes at least one vehicle component, one or more sensors, a vehicle controller, and a mobile unit. The one or more sensors monitor conditions of the at least one vehicle component. The vehicle controller is in communication with the at least one vehicle component and the one or more sensors. The mobile unit is for communicating with the vehicle controller and programmed to selectively direct the vehicle controller to activate the at least one vehicle component according to a predetermined vehicle sleep mode schedule and trigger a vehicle wake mode triggered by detection of a predetermined environmental condition. The predetermined vehicle sleep mode schedule may include a first set of instructions for operating the at least one vehicle component during vehicle sleep mode and the vehicle wake mode may activate a second set of instructions for operating the at least one vehicle component in an escalation sequence schedule to wake a passenger. The vehicle controller may be further programmed to detect a presence of the mobile unit and identify whether the mobile unit has accessible preprogrammed instructions for the at least one vehicle component during a sleep mode. The at least one vehicle component may be one of a vehicle seat, a vehicle window, a vehicle audio system, and a moveable vehicle panel. The predetermined environmental condition may be one of a vehicle cabin temperature, an amount of light entering a vehicle cabin, and a vehicle cabin noise level. The vehicle controller may be further programmed to activate the vehicle wake mode upon detection of arrival at a predetermined destination, expiration of a predetermined time-period, and receipt by the mobile unit of a phone call or other notification. The vehicle controller may be further programmed to initiate the vehicle wake mode based on detection of a passenger being asleep following expiration of a predetermined timeframe and the vehicle component maybe a seat assembly in communication with the vehicle controller. The wake mode may include an escalation sequence schedule having a command schedule directing a series of seat assembly outputs to subsequently and increasingly contact a passenger.

A vehicle system includes one or more vehicle components and a vehicle controller. The vehicle controller communicates with a mobile unit, is in communication with the one or more vehicle components, and is programmed to activate a vehicle sleep mode upon received direction from the mobile unit including preprogrammed instructions in which vehicle component commands direct the one or more vehicle components to operate to facilitate sleep conditions and wake conditions for a passenger. The wake conditions may include an escalation sequence schedule to operate the one or more vehicle components in subsequent steps to wake the passenger. The one or more vehicle components may be an audio system and the escalation sequence schedule may be a series of commands to subsequently increase a volume level of the audio system in response to detection of a passenger sleeping past a predetermined wake setting. The wake conditions may include an escalation sequence schedule to direct a series of audio outputs by the audio system to each output subsequently and increasing in volume. The vehicle controller may be further programmed to initiate the wake conditions based on receipt of a signal from a sensor indicating the passenger is asleep based on detection of one of a cabin noise level being below a predetermined value, minimal movement of a seat occupant, a manual passenger input, and an absence of sensor activity. The vehicle controller may be further programmed to activate the one or more vehicle components under the wake conditions based on detection of a passenger being asleep following expiration of a predetermined timeframe. One of the one or more vehicle components may be a seat assembly in communication with the vehicle controller. An escalation sequence schedule may be initiated including a command schedule directing a series of seat assembly outputs to subsequently and increasingly contact the passenger.

BRIEF DESCRIPTION OF THE DRAWINGS

FIG. 5 is a flow chart illustrating an example of a control system algorithm to assist in disengaging or completing a vehicle sleep mode.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
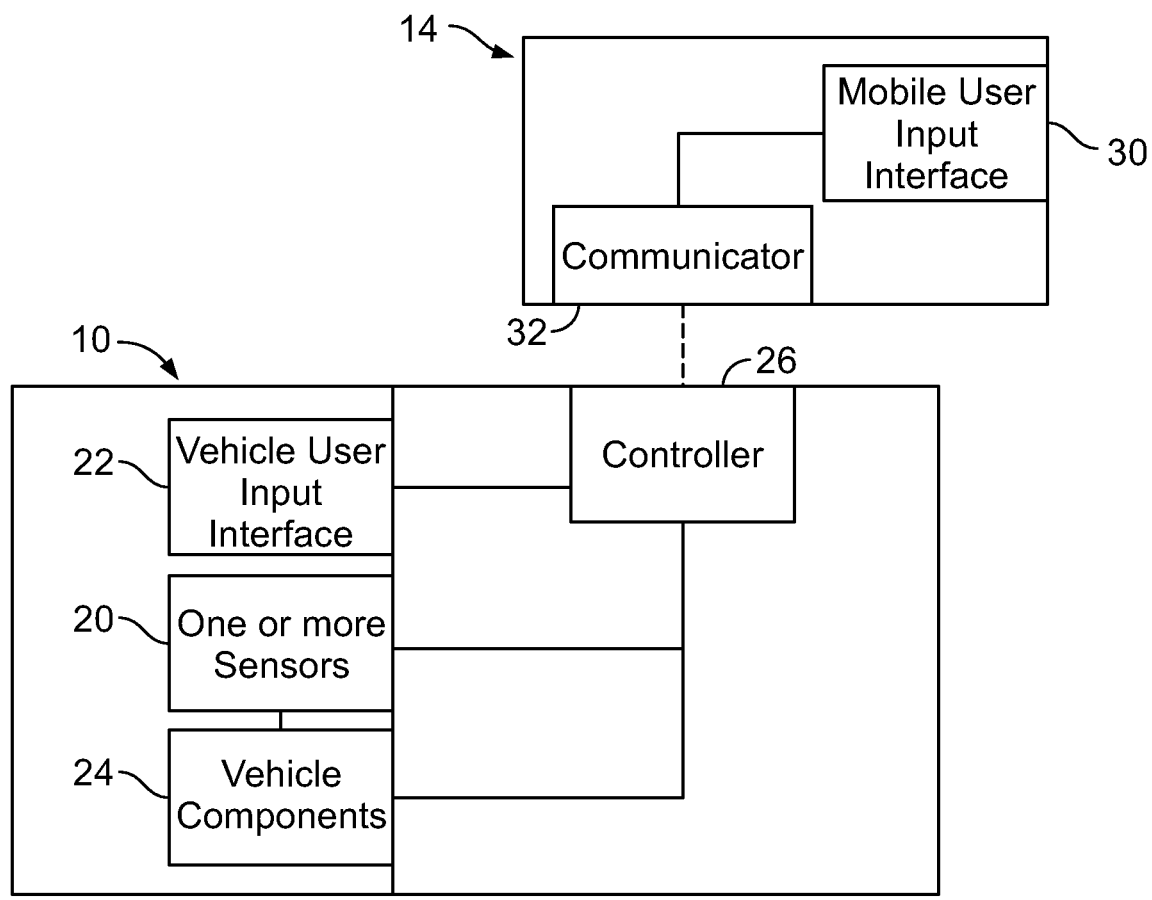
FIG. 1 is a schematic diagram illustrating an example of a vehicle and a mobile unit.

FIG. 1 is a schematic diagram illustrating an example of a communication system including a vehicle and a mobile unit. A vehicle 10 may operate with a mobile unit 14 to control operations of vehicle components based on user input or preprogrammed instructions according to, for example, a vehicle sleep mode. The vehicle sleep mode may be a vehicle mode in which vehicle components operate according to a predetermined schedule to create a passenger environment for sleeping and for waking the passenger from a sleep. The vehicle 10 may include one or more sensors 20, a vehicle user input interface 22, one or more vehicle components 24, and a controller 26. The one or more sensors 20, the vehicle user input interface 22, and the one or more vehicle components 24 may be located within a vehicle cabin. The one or more sensors 20 may detect conditions of the vehicle components 24 or other aspects of the vehicle 10 and may transmit information relating to the same to the controller 26.

The mobile unit 14 may include a mobile user input interface 30 and a communicator 32. The mobile user input interface 30 may be, for example, a touch screen or a keypad. The communicator 32 may be, for example, an infrared transmitter/receiver, a blue-tooth transmitter/receiver, or the like. User input may be transmitted from the mobile unit 14 to the controller 26 via the communicator 32. Non-limiting examples of the mobile unit 14 include a phone, a wearable device, a tablet, and a laptop.

A user may input vehicle sleep mode instructions via the mobile user input interface 30. For example, the user may input a set of instructions for the controller 26 to receive such that the controller 26 activates the one or more vehicle components 24 based on detection of one or more trigger conditions. The trigger conditions may be detected by the one or more sensors 20 or may be based on detection of arrival at a predetermined location or expiration of a predetermined time-frame. The user may also select an escalation sequence schedule in which the controller 26 outputs a command schedule to the one or more vehicle components 24 to operate in subsequent steps to assist in waking the user from sleep. Optionally, the user may input the preprogrammed sleep mode instructions directly into the vehicle user input interface 22. The communication system may be used in various applications including autonomous vehicles and ride-sharing scenarios.

The vehicle 10 and the mobile unit 14 may operate with one another such that the one or more sensors 20 may detect the mobile unit 14 when located within the vehicle 10 and access the preprogrammed sleep mode instructions. Optionally, the vehicle 10 may send a signal to the mobile unit 14 requesting permission to access the preprogrammed sleep mode instructions. The user may either grant or deny access.

Examples of the vehicle components 24 may include a vehicle seat, a mic, a vehicle window, a vehicle audio system, or a moveable vehicle panel. The controller 26 may direct operation of one or more of the vehicle components 24 based on the received information from the one or more sensors 20 or accessed preprogrammed instructions from the mobile unit 14 or the controller 26.

For example, the one or more sensors 20 may monitor conditions of the vehicle 10 and the vehicle components 24. Responsive to receipt of a signal from the one or more sensors 20 or another trigger event, the controller 26 may alter a vehicle seat status condition such as an incline position, a vibration setting, or a seat HVAC setting. If a vehicle sleep mode is operational, the controller 26 may alter the vehicle seat status conditions according to preprogrammed instructions to assist in waking a passenger. For example, the controller 26 may direct the vehicle seat to vibrate upon detection of arrival at a predetermined location or an expiration of a predetermined time-period.

As another example, responsive to receipt of a signal from the one or more sensors 20 or another trigger event, the controller 26 may alter a vehicle window status condition such as an open/close position or a position therebetween. If a vehicle sleep mode is operational, the controller 26 may alter the vehicle window status condition according to preprogrammed instructions to assist in waking a passenger. For example, the controller 26 may direct the vehicle window to open upon detection of arrival at a predetermined location or an expiration of a predetermined time-period.

As another example, responsive to receipt of a signal from the one or more sensors 20 or another trigger event, the controller 26 may alter a vehicle audio system operating condition such as a music selection, volume selection, or an on/off condition. If a vehicle sleep mode is operational, the controller may alter the vehicle audio system operating condition according to preprogrammed instructions to assist in waking a passenger. For example, the controller 26 may direct the vehicle audio system to switch to an 'on' condition and output a preselected music selection at a predetermined volume level upon detection of arrival at a predetermined location or an expiration of a predetermined time-period.

As another example, responsive to receipt of a signal from the one or more sensors 20 or another trigger event, the controller 26 may alter a moveable vehicle panel condition such as an open/close position or a position therebetween. Examples of a moveable vehicle panel include a moon-roof and a curtain or panel mounted the vehicle to provide or prevent visual access through one of the vehicle windows. If a vehicle sleep mode is operational, the controller 26 may alter the moveable vehicle panel condition according to preprogrammed instructions to assist in waking a passenger. For example, the controller 26 may direct the moveable vehicle panel to open upon detection of arrival at a predetermined location or an expiration of a predetermined time-period.

As yet another example, the controller 26 may receive signals from the one or more sensors 20 based on monitored conditions. Examples of the monitored conditions include cabin temperature, an amount of light within the cabin, passenger-generated sounds, passenger movements, and vehicle GPS positioning. Responsive to receipt of a signal from the one or more sensors 20 indicating one of the monitored conditions is within or outside of a predetermined threshold, the controller 26 may activate one of the vehicle components 24. For example, if a vehicle sleep mode is operational, the controller 26 may activate an air conditioning mode of a vehicle HVAC system to cool the vehicle cabin in response to detecting a temperature of the vehicle cabin being too warm.

Optionally, the user may program or select an escalation sequence schedule to direct operation of one or more of the vehicle components 24 in response to detection of a trigger condition during a vehicle sleep mode. The escalation sequence schedule may include commands to direct one or more of the vehicle components 24 to operate in subsequent steps as selected by the user.

For example, the escalation sequence schedule may direct an audio system to activate and gradually increase in volume upon detection of the vehicle 10 arriving at a predetermined location or upon a predetermined time-frame expiring. As another example, the escalation schedule may direct a curtain or panel to open for additional light to enter the vehicle cabin upon arriving at a predetermined location or upon a predetermined time-frame expiring. As another example, the escalation sequence schedule may direct a scent device to release a scent or direct activation of a seat HVAC system upon arriving at a predetermined location or upon a predetermined time-frame expiring. As yet another example, the escalation sequence schedule may direct a series of seat assembly outputs to subsequently and increasingly contact the user.

Figure 2:
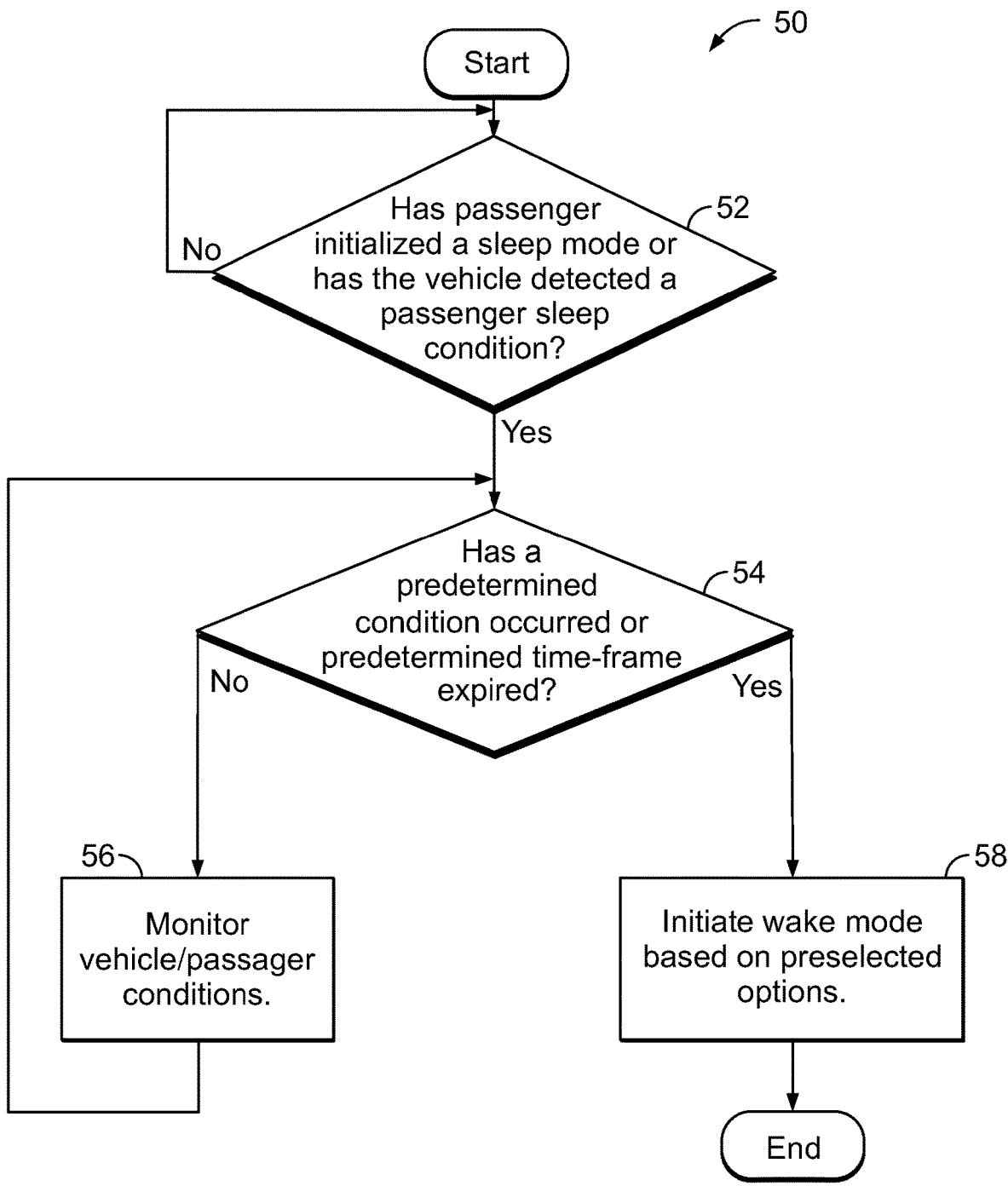
FIG. 2 is a flow chart illustrating an example of a control system algorithm for vehicle mode operation.

FIG. 2 illustrates an example of an algorithm to assist in directing operation of the vehicle components 24 and the controller 26, referred to generally as an algorithm 50. In operation 52, the controller may identify whether a passenger has initiated a vehicle sleep mode or whether a passenger sleep condition is detected. The passenger may initiate the vehicle sleep mode by either a mobile unit, such as the mobile unit 14 described above, or a vehicle interface, such as the vehicle user input interface 22 described above. In the event the controller does not detect a sleep mode or a passenger sleep condition, the controller may identify whether a predetermined condition has occurred or whether a predetermined time-frame has expired in operation 54. Arrival at a predetermined location is an example of a predetermined condition.

In the event the controller does not detect occurrence of a predetermined condition or expiration of a predetermined time-frame in operation 54, the controller and one or more sensors may monitor vehicle and passenger conditions in operation 56 until a predetermined condition is detected or a predetermined time-frame expires.

In the event the controller detects occurrence of a predetermined condition or expiration of a predetermined time-frame in operation 64, the controller may initiate a vehicle wake mode based on predetermined user input including activation of an escalation sequence schedule in operation 58.

A passenger may desire the wake mode to initiate prior to arriving at a destination to provide time for the passenger to prepare themselves. In one example, the wake mode may initiate upon detection of a vehicle arriving at or nearing a predetermined destination based on GPS coordinates. In another example, the wake mode may initiate upon detection of a predetermined environment condition indicating the passenger is still asleep. Examples of the predetermined environment condition include a vehicle cabin temperature, an amount of light entering a vehicle cabin, and a vehicle cabin noise level. In yet another example, the wake mode may initiate based on a preselected time frame relative to a preselected destination.

Figure 3:
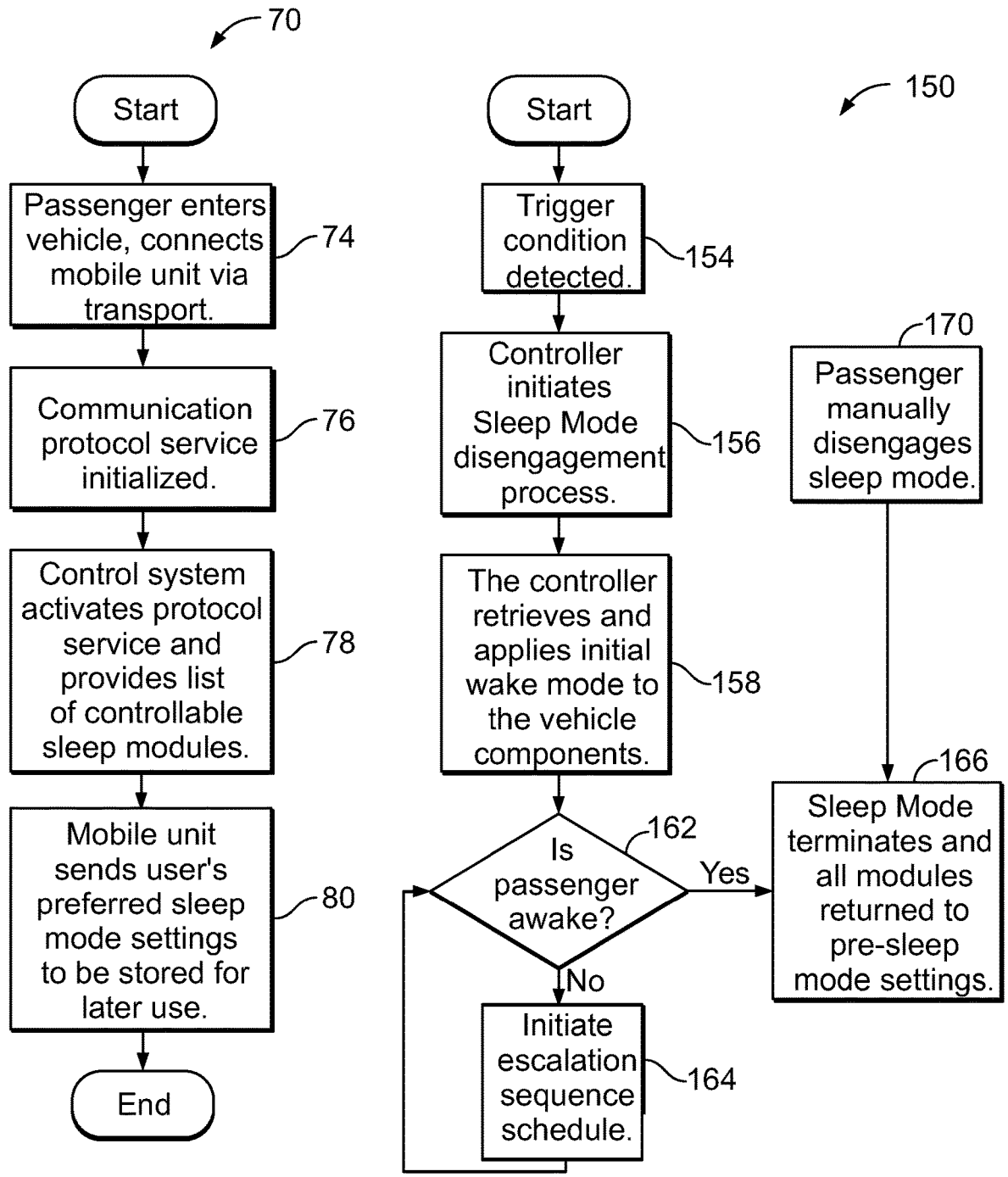
FIG. 3 is a flow chart illustrating an example of a control system algorithm for connecting a mobile unit to a vehicle control system and establishing user selected sleep mode settings.

FIG. 3 illustrates an example of an algorithm for connecting a mobile unit to a vehicle control system and establishing user selected sleep mode settings, referred to as an algorithm 70. In operation 74, a passenger having a mobile device may enter a vehicle. A control system of the vehicle may detect the mobile unit and initiate a communication protocol service in operation 76. For example, the mobile unit may connect with the controller via a USB connector, a WIFI connection, or a Bluetooth connection. In operation 78, the control system may activate the protocol service and provide a list of sleep mode options to the passenger via the mobile unit. The sleep mode options may include various instructions relating to activation of vehicle components during a sleep mode. Each of the sleep mode options may include a command schedule relating to a wake mode that may include an escalation sequence schedule. In operation 80, the vehicle control system may initiate the passenger's preferred sleep mode settings or may store the settings for later use. It is also contemplated that the passenger selected sleep mode options may be conveyed to a vehicle ahead of the passenger's contact with the vehicle.

Figure 4:
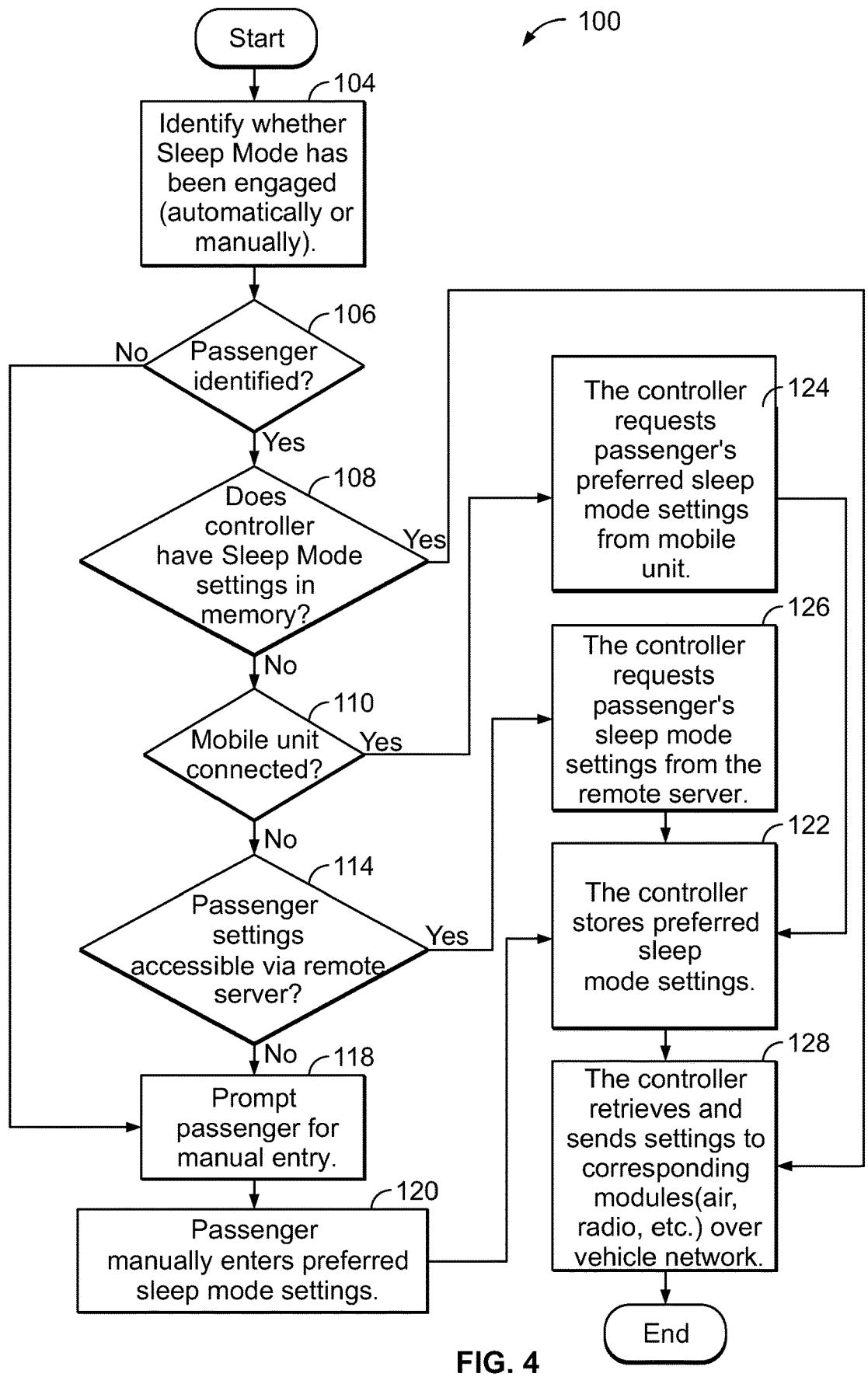
FIG. 4 is a flow chart illustrating an example of a control system algorithm relating to activation of a vehicle sleep mode setting.

FIG. 4 illustrates an example of an algorithm relating to activation of a vehicle sleep mode setting. In operation 104, a vehicle controller, such as the controller 26 described above, may identify whether a sleep mode has been engaged automatically or manually by a passenger. In operation 106, the controller may identify whether the passenger or the passenger's mobile unit is known. If the passenger's mobile unit is known, the controller may check memory to identify whether the passenger's predetermined sleep mode settings are accessible in operation 108.

If a passenger's mobile unit is not identifiable in operation 106, the controller may prompt the passenger to manually enter sleep mode settings via a mobile unit interface or a vehicle interface in operation 120.

In the event the controller cannot access the passenger's predetermined sleep mode settings, the controller may identify whether a mobile unit is available for access in operation 110. If a mobile unit is not detected in operation 110, the controller may identify whether the passenger's predetermined sleep mode settings are accessible from a remote server, such as a cloud, in operation 114. In the event the passenger's sleep mode settings are not available in the memory or the remote server, the controller may prompt the passenger to manually enter sleep mode settings via a mobile unit interface or a vehicle interface in operation 120. The controller may then store the sleep mode settings for later access in operation 122.

In the event a mobile unit is detected in operation 110, the controller may access the passenger's preferred sleep mode settings from the mobile unit in operation 124. The controller may then store the sleep mode settings for later access in operation 122.

In the event the passenger's sleep mode setting are accessible via a remote server in operation 114, the controller may access the passenger's sleep mode settings from the remote server in operation 126. The controller may then store the sleep mode setting for later access in operation 122.

In operation 128, the controller may access the passenger's sleep mode settings and send instructions to vehicle components, such as the vehicle components 24 described above, to operate according the instructions.

FIG. 5 illustrates an example of an algorithm to assist in disengaging or completing a vehicle sleep mode. In operation 154, a controller, such as the controller 26 described above, may detect occurrence of a trigger condition. Examples of trigger conditions include arrival at a predetermined destination, expiration of a predetermined time-period, or a passenger device, such as the mobile unit 14 described above, receiving a phone call or other notification.

In operation 156, the controller may initiate a disengagement process to end the sleep mode or transition to a wake mode. In operation 158, the controller may access the passenger's preselected wake mode instructions to direct operation of vehicle components, such as the vehicle components 24 described above. The wake mode instructions may include an escalation sequence schedule as described above.

In operation 162, one or more sensors, such as the one or more sensors 20 described above, may detect whether the passenger is asleep or awake. For example, the one or more sensors may send a signal to the controller indicating a passenger is asleep based on detection of one of a cabin noise level being below a predetermined value as monitored by a mic, minimal movement of a seat occupant, a manual passenger input, or an absence of sensor activity. In the event the passenger is identified as asleep, the controller may initiate the escalation sequence schedule in operation 164. In the event the passenger is identified as awake, the controller may instruct the vehicle components to operate under pre-sleep mode or normal conditions in operation 166.

Alternatively, the passenger may manually input a sleep mode disengage command in operation 170 and the controller may then instruct the vehicle components to operate under normal or pre-sleep mode conditions in operation 166. For example, the passenger may input the sleep mode disengagement command via a mobile device or a vehicle interface.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle system comprising:
    a vehicle component; and
    a controller programmed to, responsive to detecting presence of a mobile unit and selection of a vehicle sleep mode, access from the mobile unit preprogrammed sleep mode instructions and activate the vehicle component according to a sequence of escalating operations defined by the sleep mode instructions to wake a passenger from asleep.

2. The system of claim 1, wherein the controller is further programmed to send a notice to the mobile unit upon requesting the user to confirm access to the vehicle sleep mode instructions.

3. The system of claim 1 further comprising a sensor in communication with the vehicle component and the controller, wherein the controller is further programed to activate the vehicle component based on receipt of a signal from the sensor indicating a passenger is asleep.

4. The system of claim 3, wherein the signal from the sensor indicating the passenger is asleep is based on detection of one of a cabin noise level being below a predetermined value, movement of a seat occupant being below a predetermined threshold, a manual passenger input, and an absence of sensor activity.

5. The system of claim 1, wherein the activation of the vehicle component is initiated based on detection of one of expiration of a predetermined time frame, arrival at a predetermined location, and receipt of a signal indicating a phone call or other notification to the mobile unit.

6. The system of claim 1, wherein the vehicle component is an audio system in communication with the controller, and wherein the sequence of escalating operations is a command schedule directing a series of audio outputs by the audio system to subsequently increase in volume.

7. The system of claim 1, wherein the vehicle component is a seat assembly in communication with the controller, and wherein the sequence of escalating operations is a command schedule directing a series of seat assembly outputs by the seat assembly to subsequently and increasingly contact the user.

8. A vehicle connectivity system comprising:
    at least one vehicle component;
    one or more sensors to monitor conditions of the at least one vehicle component;
    a vehicle controller in communication with the at least one vehicle component and the one or more sensors; and
    a mobile unit for communicating with the vehicle controller and programmed to selectively direct the vehicle controller to activate the at least one vehicle component according to a predetermined vehicle sleep mode schedule and trigger a vehicle wake mode triggered by detection of a predetermined environmental condition.

9. The system of claim 8, wherein the predetermined vehicle sleep mode schedule includes a first set of instructions for operating the at least one vehicle component during vehicle sleep mode and the vehicle wake mode activates a second set of instructions for operating the at least one vehicle component in an escalation sequence schedule to wake a passenger.

10. The system of claim 8, wherein the vehicle controller is further programmed to detect a presence of the mobile unit and identify whether the mobile unit has accessible preprogrammed instructions for the at least one vehicle component during the vehicle sleep mode.

11. The system of claim 8, wherein the at least one vehicle component is one of a vehicle seat, a vehicle window, a vehicle audio system, and a moveable vehicle panel.

12. The system of claim 8, wherein the predetermined environmental condition is one of a vehicle cabin temperature, an amount of light entering a vehicle cabin, and a vehicle cabin noise level.

13. The system of claim 8, wherein the vehicle controller is further programmed to activate the vehicle wake mode upon detection of arrival at a predetermined destination, expiration of a predetermined time-period, and receipt by the mobile unit of a phone call or other notification.

14. The system of claim 8, wherein the vehicle controller is further programmed to initiate the vehicle wake mode based on detection of a passenger being asleep following expiration of a predetermined timeframe, wherein the vehicle component is a seat assembly in communication with the vehicle controller, and wherein the wake mode includes an escalation sequence schedule having a command schedule directing a series of seat assembly outputs to subsequently and increasingly contact the passenger.

15. A vehicle system comprising:
one or more vehicle components; and
a vehicle controller to communicate with a mobile unit, in communication with the one or more vehicle components, and programmed to activate a vehicle sleep mode upon received direction from the mobile unit including preprogrammed instructions in which vehicle component commands direct the one or more vehicle components to operate to facilitate sleep conditions and wake conditions for a passenger.

16. The system of claim 15, wherein the wake conditions include an escalation sequence schedule to operate the one or more vehicle components in subsequent steps to wake the passenger.

17. The system of claim 16, wherein the one or more vehicle components is an audio system, and wherein the escalation sequence schedule is a series of commands to subsequently increase a volume level of the audio system in response to detection of a passenger sleeping past a predetermined wake setting.

18. The system of claim 17, wherein the wake conditions include an escalation sequence schedule to direct a series of audio outputs by the audio system in which each output subsequently increases in volume.

19. The system of claim 15, wherein the vehicle controller is further programmed to initiate the wake conditions based on receipt of a signal from a sensor indicating the passenger is asleep based on detection of one of a cabin noise level being below a predetermined value, minimal movement of a seat occupant, a manual passenger input, and an absence of sensor activity.

20. The system of claim 15, wherein the vehicle controller is further programmed to activate the one or more vehicle components under the wake conditions based on detection of the passenger being asleep following expiration of a predetermined timeframe, wherein one of the one or more vehicle components is a seat assembly in communication with the vehicle controller, and wherein an escalation sequence schedule is initiated including a command schedule directing a series of seat assembly outputs to subsequently and increasingly contact the passenger.

* * * * *